United States Patent
Baugher et al.

(10) Patent No.: US 7,234,063 B1
(45) Date of Patent: *Jun. 19, 2007

(54) METHOD AND APPARATUS FOR GENERATING PAIRWISE CRYPTOGRAPHIC TRANSFORMS BASED ON GROUP KEYS

(75) Inventors: Mark Baugher, Portland, OR (US); David McGrew, Poolesville, MD (US); Jan Vilhuber, San Luis Obispo, CA (US); Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 874 days.

This patent is subject to a terminal disclaimer.

(21) Appl. No.: 10/229,347

(22) Filed: Aug. 27, 2002

(51) Int. Cl.
*H04L 9/00* (2006.01)
*G06F 21/20* (2006.01)

(52) U.S. Cl. ............... 713/189; 713/168; 713/169; 713/171; 713/153; 380/259; 380/283; 380/277; 726/3; 726/14; 726/15

(58) Field of Classification Search ............... None
See application file for complete search history.

(56) References Cited

U.S. PATENT DOCUMENTS

| | | | |
|---|---|---|---|
| 5,729,608 A * | 3/1998 | Janson et al. ............ 713/171 |
| 6,330,562 B1 * | 12/2001 | Boden et al. ............ 707/10 |
| 6,363,154 B1 * | 3/2002 | Peyravian et al. ....... 380/283 |
| 6,438,612 B1 * | 8/2002 | Ylonen et al. ........... 709/249 |
| 6,915,437 B2 * | 7/2005 | Swander et al. ......... 726/1 |
| 6,959,089 B1 * | 10/2005 | Sprunk ................... 380/239 |
| 2002/0012433 A1 * | 1/2002 | Haverinen et al. ....... 380/247 |

OTHER PUBLICATIONS

Yuliang Zheng, "Amending Leighton and Micali's Key Distribution Protocol," Nov. 2, 1993, pp. 1-5.
David A. McGrew, "The Universal Security Transform, <draft-mcgrew-saag-ust-01.txt>," Apr. 2002, pp. 1-14.
Mark Baugher et al., "Group Domain of Interpretation (GDOI), <draft-ietf-msec-gdoi-01-txt," Aug. 20, 2001, pp. 1-42.
D. Harkins et al., "The Internet Key Exchange (IKE)," Nov. 1998, pp. 1-41.
D. Piper, "The Internet IP Security Domain of Interpretation for ISAKMP," Nov. 1998, pp. 1-32.
H. Orman, "The OAKLEY Key Determination Protocol," Nov. 1998, pp. 1-55.
Anonymous, "Tunnel Endpoint Discovery Enhancement," Cisco IOS Release 12.0(5)T, undated, pp. 1-10.

(Continued)

*Primary Examiner*—Nasser Moazzami
*Assistant Examiner*—Carl Colin
(74) *Attorney, Agent, or Firm*—Hickman Palermo Truong & Becker LLP

(57) ABSTRACT

Group key management techniques are applied to generating pair-wise keys for point-to-point secure communication applications. Nodes participating in a secure communication group each receive a group key and associated policy information. When a first node wishes to establish a secure point-to-point connection to a second node, the first node derives a pairwise key from the group key and policy information, for example, by hashing the group key and information identifying the two nodes. As a result, a pairwise key is generated without exchanging negotiation messages among the two nodes and without expensive asymmetric cryptographic computation approaches.

44 Claims, 10 Drawing Sheets

OTHER PUBLICATIONS

David A. McGrew, Ph.D., "mcgrew at ieee dot org," file:////Sj/clients/Cisco%20Systems..., printed Feb. 12, 2003, pp. 1-8.

Mark Baugher et al., "Group Domain of Interpretation (GDOI), <draft-ietf-msec-gdoi-02.txt," Jan. 7, 2002, pp. 1-28.

David A. McGrew, "Segmented Integer Counter Mode: Specification and Rationale," Oct. 19, 2000, pp. 1-4.

Ohad Rodeh, "Secure Group Communication," Submitted to the Senate of the Hebrew University in Jerusalem (2001), 106 pages.

* cited by examiner

Fig. 2A

202 ENROLL POTENTIAL GROUP MEMBERS IN A SECURE GROUP

204 GROUP MEMBER REQUESTS GROUP KEY

206 KEY SERVER PROVIDES GROUP KEY AND DESCRIPTOR TO REQUESTING MEMBER

Fig. 2B

210 FIRST GROUP MEMBER DERIVES A PAIRWISE DATA-SECURITY SESSION KEY FROM GROUP KEY

212 FIRST GROUP MEMBER ENCRYPTS PACKETS USING DERIVED DATA-SECURITY SESSION KEY

214 FIRST GROUP MEMBER SENDS ENCRYPTED PACKETS TO SECOND GROUP MEMBER

216 SECOND GROUP MEMBER RECEIVES ENCRYPTED PACKETS

218 SECOND GROUP MEMBER DERIVES DATA-SECURITY SESSION KEY

220 SECOND GROUP MEMBER DECRYPTS & PROCESSES PACKETS

METHOD AND APPARATUS FOR GENERATING PAIRWISE CRYPTOGRAPHIC TRANSFORMS BASED ON GROUP KEYS

FIELD OF THE INVENTION

The present invention generally relates to computer-based cryptography as applied to data networks. The invention relates more specifically to a method and apparatus for generating pairwise cryptographic transforms based on group keys.

BACKGROUND OF THE INVENTION

Computer-based encryption techniques often require generating a cryptographic transform for use only by two parties to a communication session. Such cryptographic transforms may be used as pairwise keys that are applied to message-authentication codes, encryption, or for other purposes. For example, such a cryptographic transform is needed to establish an encrypted virtual private network (VPN) communication session between two network devices, such as routers.

In one approach for generating cryptographic transforms for use by only two parties, a certificate authority (CA) that forms a part of a public key infrastructure (PKI) in a network generates digital certificates. Each party to a secure communication session receives a digital certificate. Using the digital certificates, one party can authenticate itself to another party, and the parties can then generate and exchange secure session keys. While PKI approaches are secure and scalable, few networks presently use them, because of the perceived complexity of installing and maintaining the CA, and the high cost of commercial CA products. While some CAs cost less and are easier to install and maintain, they are not generally accepted for a variety of business reasons.

Another past approach involves distributing pre-shared keys to all parties that may potentially participate in secure communications. A pre-shared key is a key that is known to all (usually two) parties to an encrypted communication. They can be used in symmetric encryption and decryption algorithms, which are computationally more efficient than the public-key encryption and decryption techniques used in PKI, or to generate a hashed message authentication code (HMAC). When used correctly, such pre-shared group keys can provide a valid and secure system. However, pre-shared keys often are distributed manually, which is tedious and not scalable to fully meshed networks containing thousands of nodes.

To address these problems, some networks use one key for all parties in a particular security domain; such keys are termed pre-shared group keys, which serve as authenticators in authenticated key exchange protocols. For example, using pre-shared group keys, when routers in a particular security domain need to set up a VPN, the routers use the pre-shared group keys to authenticate each other prior to negotiating a session key for encrypting communications between themselves. This approach presents problems when a key is compromised and needs to be revoked, expires, or needs to be changed for any other reason. Changing a pre-shared group key requires contacting all parties that have the group key to provide a new group key. In a complex enterprise network comprising thousands of routers, group key revocation potentially requires sending management instructions to all the routers, which is costly, time-consuming, and undesirable. Automated management of pre-shared authentication keys is preferable.

Further, pre-shared keys also are often selected by a network administrator in a manner that does not result in acceptable levels of security. For example, selecting keys that are derived from dictionary words, or that are otherwise non-random, greatly reduces the security of the system. There is a need for a way to automatically generate highly secure keys.

Past group key approaches also are not directly applicable to generating a cryptographic transform only for use by two parties. In group key approaches, all group members have the same shared symmetric cryptographic key for encryption or authentication of session data, and any group member can send a message to any other group member, or to multiple group members using multicast techniques. Although two group members may have a need to establish a private security association among only them, in past approaches, setting up pairwise session keys has required use of asymmetric cryptographic techniques, which are computationally expensive to perform, and which introduce significant latency into packet transmission. It would be useful to have a way to use group key principles to set up pairwise session keys among peer members in a group using more computationally efficient symmetric cryptographic techniques.

Further, when a cryptographic transform is needed for two-party or peer-to-peer communication, the fact that the two parties often are members of a larger group is of interest. For example, two routers that participate in a particular VPN may be members of a larger group of all routers in a network, any of which may potentially participate in one or more other VPNs. Groups often define access control properties of group members that may be useful in establishing pairwise keys.

Group Domain of Interpretation (GDOI) is a mechanism used with Internet Key Exchange (IKE) that provides a means for distributing and managing keys for groups of mutually trusted systems. However, distributing a group key using GDOI entails as much complex processing as IKE to set up a Security Association (SA) at each of the parties to a group. Therefore, in past approaches GDOI has been used only for distributing group keys on a relatively infrequent basis, and not for distributing pairwise keys for use in VPNs and other two-party communication mechanisms whenever there is a need to establish one. Nevertheless, a network may benefit from the capability to set up two-party, peer-to-peer secure communication among members of the group even based on the group keys have already been distributed. These benefits include automated management of pre-shared entity-authentication keys for IKE or other key-establishment protocols. The benefits also include reduced computation and message latency for IPsec ESP or other data-security protocols.

Based on the foregoing, there is a clear need for an improved mechanism for generating pairwise cryptographic transforms for use in secure communication sessions among two parties who are members of a group that has a previously established group shared secret or group key.

There is a particular need for a mechanism for generating pairwise cryptographic transforms for use in secure communication sessions among two parties that can automatically generate highly secure pairwise keys based on previously established group shared secrets or group keys.

There is a need for such a mechanism that is scalable for use with thousands of parties, that is easy to implement, and that provides practical key management, including easy revocation of keys and deletion or addition of group members.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a flow diagram of a process of preparing to generate pair-wise keys, according to a first embodiment;

FIG. 2B is a flow diagram of a process of generating pair-wise keys for use in private encrypted communications among a first and second group member;

DETAILED DESCRIPTION OF THE PREFERRED EMBODIMENT

Figure 1:
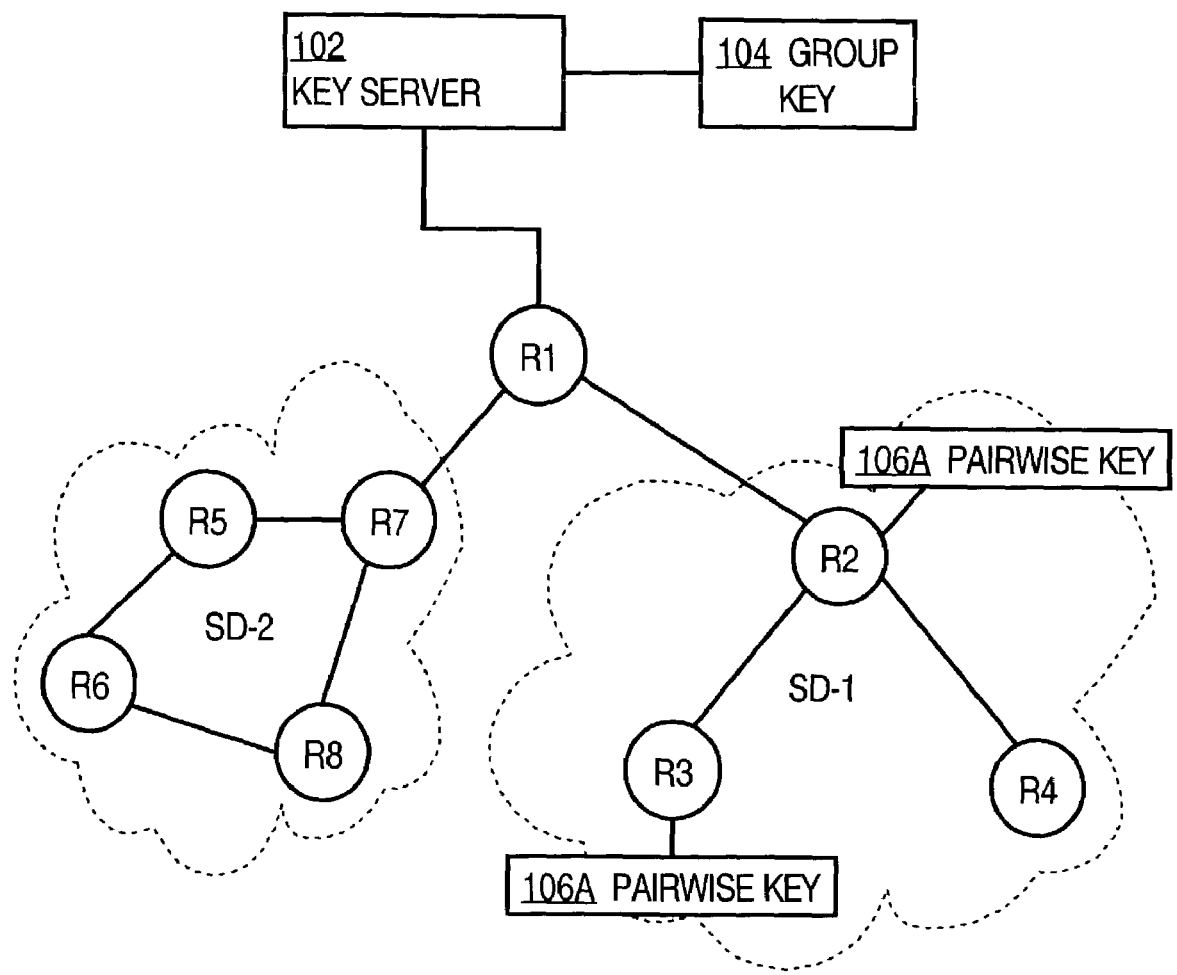
FIG. 1 is a block diagram of a system for generating pair-wise keys, according to a first embodiment.

A method and apparatus for generating pairwise cryptographic transforms based on group keys is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Pair-Wise Key Derivation Approach Based On Group Keys and Descriptor Values -continued 2.1    Structural and Functional Overview
    2.2    Obtaining the Group Key and Policy information from the Group Controller
    2.3    Deriving a Data-Security Session Key from the Group Key
    2.4    Re-Keying
3.0  Pair-Wise Key Derivation Approach Based On GDOI
    3.1    Structural and Functional Overview
    3.2    Establishing a VPN Using Group Key Distribution
    3.3    Re-Keying
    3.4    Communicating Policy Information
    3.5    Command-Line Interface Approaches
    3.6    Integration with IKE Protocol and TED Protocol
    3.7    Security Enhancements
    3.8    Initial Provisioning
    3.9    Integration with Membership List Functions
    3.10   Application Programming Interface for GDOI Module
4.0  Implementation Mechanisms—Hardware Overview
5.0  Extensions and Alternatives 1.0 Overview Group key management techniques are applied to generating pair-wise keys for point-to-point secure communication applications. Nodes participating in a secure communication group each receive a group key and associated policy information. When a first node wishes to establish a secure point-to-point connection to a second node, the first node derives a pairwise key from the group key and policy information, for example, by hashing the group key and information identifying the two nodes. As a result, a pair-wise key is generated without exchanging negotiation messages between the two nodes and without expensive asymmetric cryptographic computation or manual pre-shared key approaches.

The group key management techniques offer low latency, low computation properties for establishing authenticators or data keys and solve the problem of deriving a unique or secret pair-wise data key from a group key with zero message latency. When one group member desires to establish a secure point-to-point connection to one other group member, the group members can determine a pairwise key for use in encrypting the point-to-point communications with zero additional key management latency. Thus the disclosed approaches avoid the multi-roundtrip message exchanges and expensive computation that are required in conventional asymmetric cryptography approaches.

In this context, group members may consist of users, network end stations such as processing devices, network infrastructure devices such as routers, or other distributed processing devices such as Digital Versatile Disc (DVD) players, Internet Protocol (IP) phones, etc. Group keys are security associations that are shared among more than two members. For example, in security protocols such as SSL/TLS or IPsec, two and only two endpoints participate; in contrast, in group keying, more than two members participate.

The system and method allow VPNs and other point-to-point security applications, for example, to establish pair-wise keys that are unique to the peers, with zero message latency. The subject invention furthermore permits the automated management of authenticators used by two parties to establish data keys. Also, the computation and memory needed to derive data keys and authenticators from group keys in peer security devices is very low.

Thus the present invention discloses two useful and novel applications for automated group-key management. The first is to use a group key in place of a pre-shared key to authenticate each entity involved in a key-establishment procedure. The second application is to use group keys to derive pairwise session keys that encrypt and/or authenticate individual messages. Whereas the first application permits point-to-point key establishment based on group-key authenticators. The second application obviates the need for point-to-point key establishment for certain environments. Thus, the approaches herein provide automated management of pre-shared keys, faster establishment of secure sessions, and great expansion in the capacity of VPNs, servers, concentrators, and other devices that provide security services to host computers. Embodiments may be used in unicast and multicast virtual private network, client-server security services, among other applications.

According to one approach, a group key VPN (GKVPN) is established. A GKVPN is a VPN in which each pairwise connection is derived from a group key that has been automatically assigned by a group key distribution or assignment mechanism. In one embodiment, the group key distribution mechanism is GDOI. The group key distribution mechanism establishes secure keys among all network nodes in a security domain. Using an automatic group key distribution mechanism in this manner provides better security, because an automatically generated key may be selected at random, can be changed frequently, and can be revoked easily. This provides for fast, efficient and secure means for excluding a member of the group for any reason.

In one specific approach, a GKVPN may be used for pre-shared keys of the type defined in the Internet Key Exchange (IKE) protocol, as specified in RFC 2409 and successors. In general, embodiments are applicable to any point-to-point communication mechanism that uses peer-to-peer communications with a shared secret.

When GDOI is used as the group key distribution and management mechanism in this approach, a GDOI client, such as a router operating in the role of a GDOI client, is required to authenticate to a key server before the client receives the group key. Therefore, in the GKVPN approach described herein, a distinct key is configured for each router. However, the GKVPN approach still provides improvements over prior approaches, including:

1. Only n keys are needed for n members of a group, since each member of the group need only be able to authenticate with the key server, instead of having to have n^2 keys, i.e. One key for each pair of members (or one key for all members, but which is never changed).
2. When adding a new member to the group, only the router (and possibly the key server) need to be updated, and not each router in the group.
3. When removing a member from the group, only the key server needs to be updated, and the clients will pick up the new group key.
4. A first member of the group can establish peer-to-peer secure communications with a second member of the group with minimal additional key generation time, so that communication latency is minimized.

In general, embodiments are applicable to any point-to-point communication mechanism that uses peer-to-peer communications with a shared secret or a negotiated data security key. Any system or method that establishes new data-security session keys or sends a data-security protocol packet is within the scope of the present disclosure.

In other aspects, the invention encompasses a computer apparatus and a computer readable medium configured to carry out the foregoing steps.

2.0 Pair-Wise Key Derivation Approach Based on Group Keys and Descriptor Values 2.1 Structural and Functional Overview FIG. 1 is a block diagram of a system for generating pair-wise keys, according to a first embodiment. A key server 102 is communicatively coupled in a network 100 comprising a plurality of packet data routers R1, R2, R3, etc. A first security domain SD-1 includes routers R2, R3, R4, and a second security domain SD-2 includes routers R5, R6, R7, R8. SD-1 and SD-2 may also comprise groups in which the routers therein are group members. For purposes of illustrating a simple example, FIG. 1 depicts only eight routers; however, in a practical embodiment, there may be any number of network devices involved.

FIG. 2A is a flow diagram of a process of preparing to generate pair-wise keys, according to a first embodiment. For purposes of illustrating a clear example, the process of FIG. 2A is described herein with respect to the example network context of FIG. 1. However, embodiments are not limited to that context, and may be used in any group membership situation.

In block 202, one or more potential group members are enrolled in a secure group. For example, data representing employees of an enterprise are enrolled in a secure group of employees who are permitted to use a VPN. The specific enrollment mechanism is not critical. Enrollment may use, for example, a common credential system such as an X.509 digital certificate generated by a certificate authority of a public key infrastructure, or a token card that authorizes a member to get access to the group key.

In block 204, one of the enrolled, authorized members requests a group key from a group controller or key server. Processing a request typically involves negotiating a pair-wise key between the key server and the requesting member. For example, with reference to FIG. 1, each of the group members R2, R3, etc. contacts the key server 102, registers with the key server, and negotiates an individual pairwise key with the key server.

In block 206, in response, the key server provides the group key to the requesting member. In one embodiment, the requesting member receives a copy of the group shared secret or group key that is encrypted using that group member's pairwise key that it established with the key server. As a result, all group members acquire the same shared group secret. The key server also provides descriptor information or policy information to the requesting member. The descriptor is a set of information that identifies security parameters that are applicable to the data-security protocol session that the requesting member is seeking to establish or that are applicable to the pre-shared key, which might also be derived from the group key. Embodiments of descriptors are described further below.

FIG. 2B is a flow diagram of a process of generating pair-wise keys for use in private encrypted communications among a first and second group member. FIG. 2B described the use of deriving a pair-wise group key for a data security protocol. The steps of FIG. 2B may be carried out, for example, after the process of FIG. 2A is carried out, and at the time that two group members need to establish a two-party, peer-to-peer or point-to-point secure connection.

In block 210, at the time that a data-security session is commenced, a first group member derives a data-security session key from the group key. Techniques for key derivation are described further below. In block 212, the first group member encrypts packets in a message directed to a second group member using the data-security session key that the first group member derived. In block 214, the first group member sends the encrypted packets to the second group member.

In block 216, the second group member receives the encrypted packets. In block 218, the second group member derives a data-security session key by applying the same techniques for key derivation that the first group member used. As a result, the second group member independently derives a data-security session key that is identical to the key derived by the first group member. Using its data-security session key, the second group member decrypts the encrypted packets and processes them, as indicated in block 220.

Figure 2C:
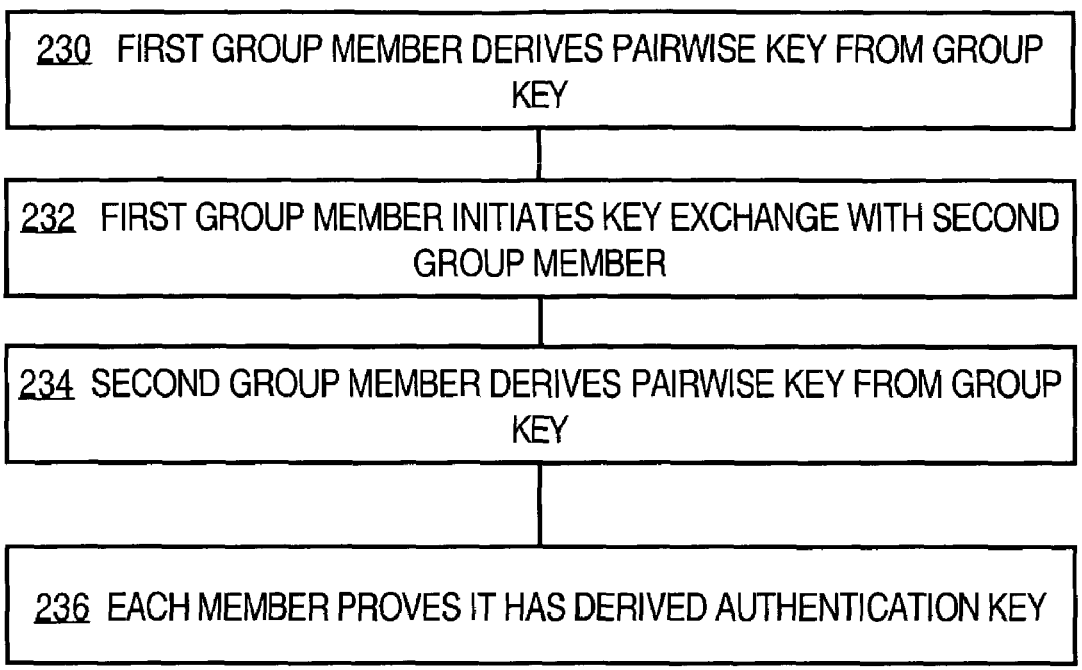
FIG. 2C is a flow diagram of a process of generating a pairwise authentication key that can serve as an authenticator for an authenticated key exchange.

FIG. 2C is a flow diagram that shows steps of a second application or use of the subject invention. In FIG. 2C, a first group member derives a pre-shared secret from the group key in block 230 using the pairwise derivation method described below. The first member then initiates an authenticated key exchange with a second group member in block 232. The second group member derives a pre-shared secret from the group key in block 234 in the same way that the first group member performs this task in block 230. At this point, both group members can use the derived pairwise key to authenticate each other in the authenticated key exchange, as indicated in block 236.

A typical embodiment is applied to a large network of routers, in which group members are trusted routers; for this reason, the approaches herein are not generally concerned with preventing one group member from intercepting and snooping on the private communications of two other group members, by deriving the same authenticator or data-security session key that was used by the two other group members.

2.2 Obtaining the Group Key and Policy Information from the Group Controller

A group controller or key server can securely download a shared key to an authorized party, as in block 206 of FIG. 2A, using protocols such as GDOI, Oakley, and others. Descriptive information, also termed "policy" or "metadata," is provided with the shared key to describe how it may be used.

Figure 3:
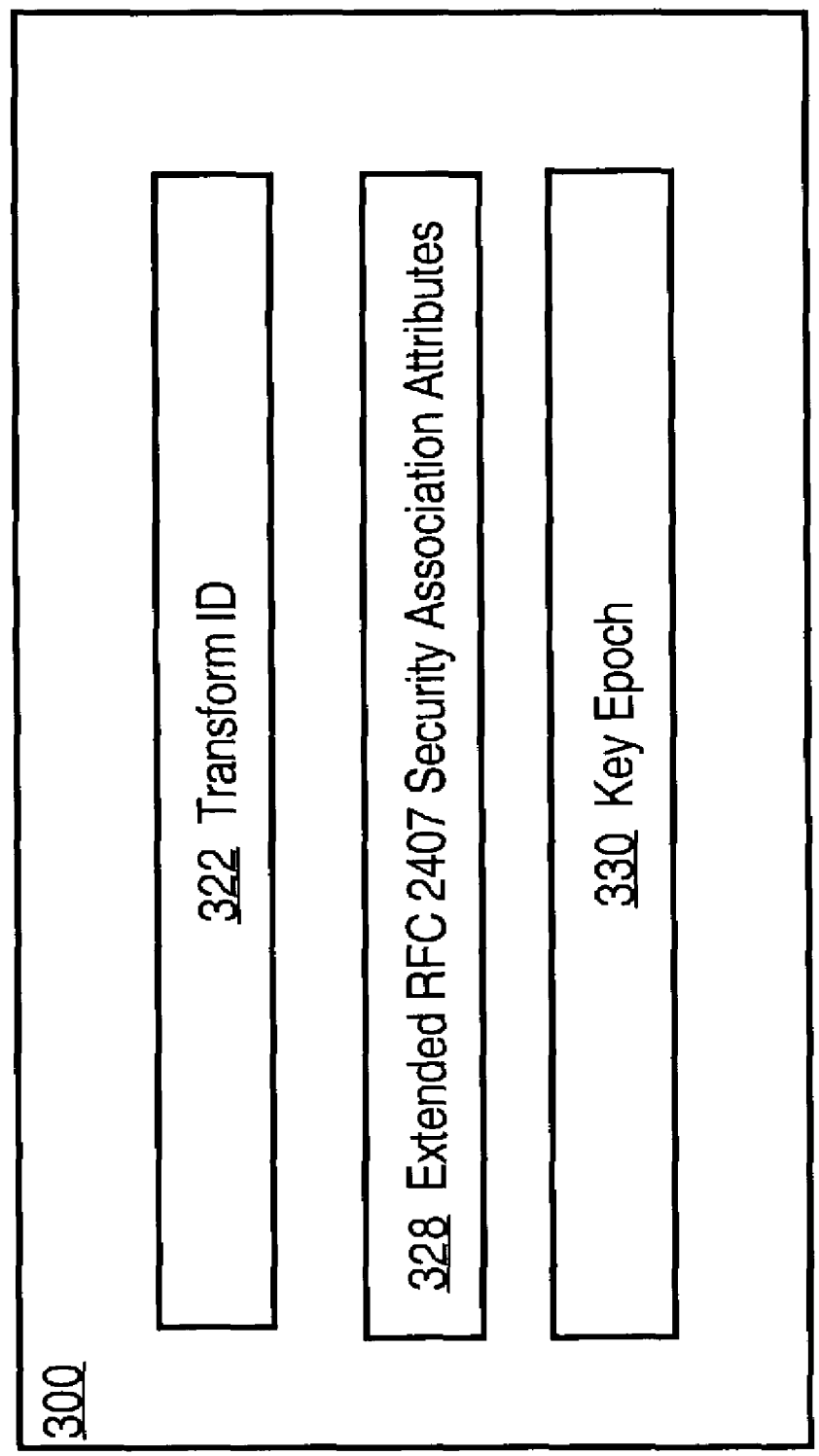
FIG. 3 is a block diagram illustrating a format of a security association ("SA") payload.

The GDOI protocol provides the descriptive information in a Security Association (SA) payload. FIG. 3 is a block diagram illustrating a format of the SA payload for deriving a pairwise key from a group key for a data-security protocol. Data values are carried in a SA payload in a plurality of fields. Thus, in one embodiment, in block 206 a requesting group member receives the values identified in FIG. 3 with the group key.

In the embodiment of FIG. 3, the SA payload comprises a transformation identifier field 322, an extended attributes field 328, and a key epoch field 330.

The specific purpose of each such field and details of using the fields are defined in the GDOI protocol, which is well known in the pertinent technical field. The transformation identifier field 322 specifies an encryption algorithm to be used. In certain embodiments, AES-Counter Mode is used. If the peers need multiple, concurrent pair-wise data-security sessions, then the key server must provide multiple SA payloads to the peers, wherein one SA payload is associated with each session.

The extended attributes field 328 may carry, for example, information identifying a data authentication algorithm. In one embodiment, TMMH is used as an authentication algorithm.

The key epoch value 330 specifies a continuously increasing key sequence number in order to uniquely identify a key.

2.3 Deriving a Data-Security Session Key or Pre-Shared Authentication Key (Authenticator) from the Group Key A pair-wise key is derived from the group key, as in block 210 of FIG. 2B, according to one of two alternative approaches.

In a first approach, each peer group member to a point-to-point communication uses one or more of identity attributes, in combination with the group key, as a basis for deriving a data-security session key. For example, in one specific embodiment, each group member applies a pseudorandom function to a combination of the group key and one or more of the identity attributes. Both the source and destination identity values of the first and second group members may be used. This ensures that the pair-wise key is distinct from any other pair-wise key that other peers may derive.

Figure 4A:
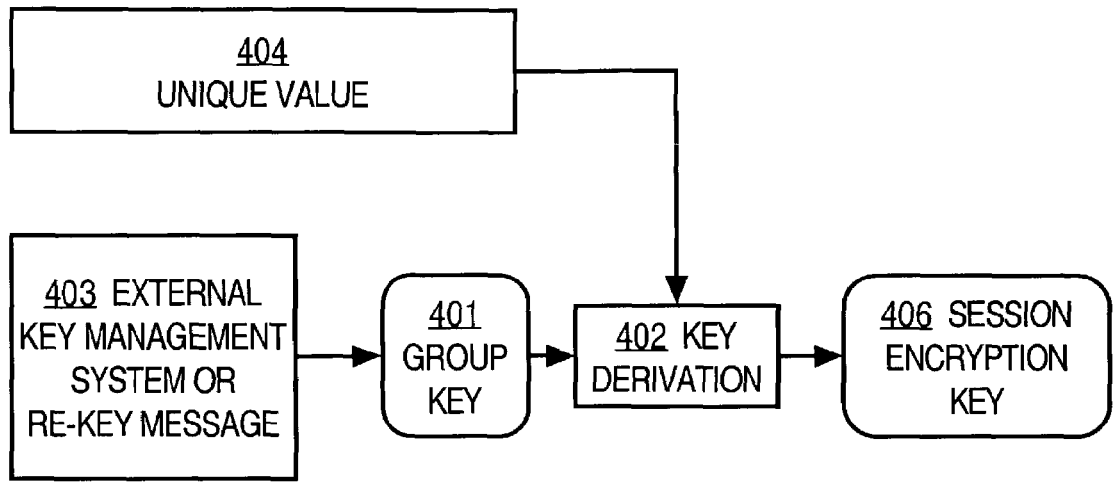
FIG. 4A is a block diagram of an approach for deriving a key that may be used in either of the foregoing approaches.

FIG. 4A is a block diagram of an approach for deriving a key that may be used in either of the foregoing approaches.

In this approach, the group key 401 is provided as input to a Key Derivation Function 402. The group key 401 is received from an external key management source 403, such as a key server, or through a re-key message. A unique value 404 is also provided as input to the Key Derivation Function 402. The unique value may comprise the identity values of the first approach above. The Key Derivation Function 402 may comprise a pseudorandom function, or any other algorithm that can generate a unique result value based on the foregoing inputs. The Key Derivation Function 402 generates a session encryption key or authenticator 406 as output. Output key 406 may be used as a pair-wise data-security session key. Or output key 406 may be an authenticator for a key-establishment protocol.

Figure 4B:
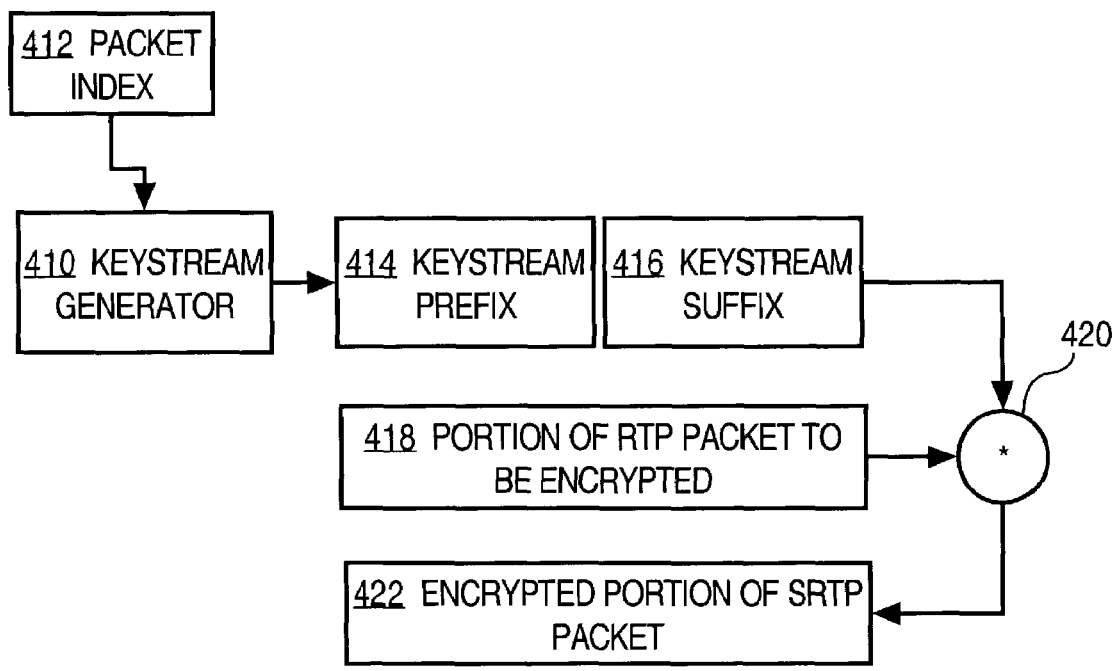
FIG. 4B is a block diagram showing an encryption approach that may be used to encrypt data packets using a derived data-security session key.

FIG. 4B is a block diagram showing an encryption approach that may be used to encrypt data packets using a derived data-security session key. The approach of FIG. 4B is based on Universal Security Transform ("UST") AES Counter Mode encryption.

A keystream generator 410 is initialized with the session encryption key 406 of FIG. 4A. The keystream prefix is an authentication key as described by UST. Thus, authentication can be performed rather than encryption, or both may be performed, or only encryption may be used. Each packet sent in the data-security session protocol contains a unique packet index value 412, which provides a seed value for the keystream generator 410 for each packet. For example, the IPsec ESP sequence number may be used as packet index value 412; alternatively, the SPI value is used as the packet index.

As output, keystream generator provides a keystream segment consisting of prefix 414 and suffix 416. These values, and a portion of an RTP data packet 418, are applied as inputs to a combination function 420. An encrypted portion of an SRTP packet 422 is provided as output.

2.4 Re-Keying

At any time, asynchronous with respect to the process of FIG. 2B, one or more group keys may be renewed or revoked by the key server. Referring again to FIG. 1, to renew or revoke a key, key server 102 sends a re-key message to all group members. A multicast message may be used. The re-key message contains sufficient context information to enable each group member to decrypt the re-key message and obtain a replacement group key from it.

Alternatively, known key tree approaches may be used, in which keys held by group members are represented by leaf nodes in a multiway key tree, and intermediate tree nodes represent mathematical relationships of keys. In a key tree approach, a group member is easily excluded from a group by invalidating its key and re-issuing new keys only to those group members located on a path in the tree from the excluded group member to the root node. Thus, a key tree approach reduces the number of required re-key messages by enabling the key server to multicast a re-key message only to selected nodes in a portion of the tree.

Thus, in the foregoing approach, every member of a group receives a shared group secret. Each member of the group then can rapidly generate a pairwise key for use in point-to-point communication with another member, by applying a specified computational process (such as hashing the group shared secret in combination with peer identity information). Because each group member uses the same heuristics to generate the pairwise key, a first group member can compute the pairwise key with confidence that a second group member to a point-to-point connection will also generate the same pairwise key. No negotiation messages are exchanged among the first and second group members to determine a pairwise key; each member simply derives the key using the specified heuristics. As a result, the first and second group members can establish a pairwise key nearly instantly and with zero message latency, and then encrypt communications on the point-to-point connection using efficient symmetric techniques or use the pairwise key as an authenticator in an authenticated key establishment.

3.0 Pair-Wise Key Derivation Approach Based on GDOI

According to another embodiment, a pair-wise key derivation approach based on GDOI is provided. One embodiment is useful in establishing point-to-point VPN communications based on group keys that are received using GDOI, and therefore is termed a GKVPN approach. However, other embodiments are applicable to any other form of point-to-point data communication in which peer nodes at the endpoints participate in a group that uses a shared secret or group key.

The GKVPN approach provides several significant improvements over past approaches. For example, the approaches herein scale to large numbers of members in a group, provide for easy revocation of keys and exclusion or addition of group members, and provide for easy implementation. Certain embodiments also support re-key/group key-push and membership lists, and inter-operate with firewalls and network address translation (NAT) mechanisms.

3.1 Structural and Functional Overview

Figure 5A:
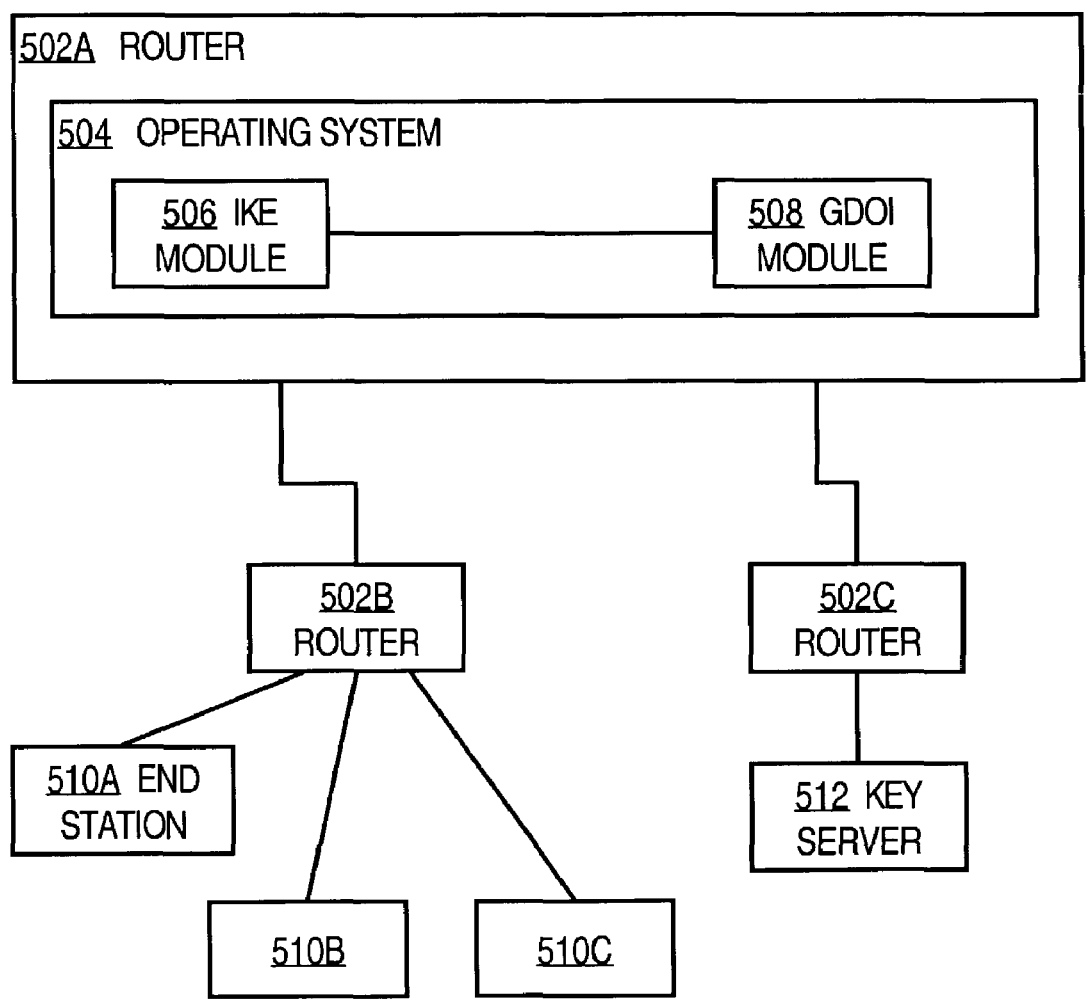
FIG. 5A is a block diagram of an example network that may be used in an implementation of a GKVPN approach.

FIG. 5A is a block diagram of an example network that may be used in an implementation of a GKVPN. Routers 502A, 502B, 502C participate in a local area network, wide area network, or internetwork. Further, routers 502A, 502B, 502C are organized in a security domain, so that any of them may establish a VPN connection to any other. Each of the routers 502A, 502B, 502C executes an operating system 504 having an IKE module 506 and a GDOI module 508. In one embodiment, operating system 504 is Internetworking Operating System (IOS), from Cisco Systems, Inc. Operating system 504 may include many other modules for performing many other routing functions, supporting various network protocols, etc. Thus, IKE module 506 and GDOI module 508 are illustrated as examples because they are particularly pertinent to the present disclosure, but are not the only modules within operating system 504.

Each router 502A, 502B, 502C is communicatively coupled to one or more end stations that generate and receive data packets for purposes of communicating with other end stations. For example, router 502B is coupled to end stations 510A, 510B, 510C. Each of the end stations may comprise a personal computer, workstation, server, printer, or other processing device or peripheral. There may be any number of end stations. In some embodiments, any of routers 502A, 502B, 502C is coupled to a wireless gateway, voice-over-IP gateway, or other systems for communicating wirelessly or over wirelines to wireless end stations.

At least one of the routers 502A, 502B, 502C is coupled to a key server; as an example, router 502C in FIG. 5A is coupled to key server 512. The key server 512 functions as a central point for generating, issuing, revoking, and otherwise managing group keys.

For purposes of illustrating a simple example, FIG. 5A shows three routers, three end stations, and one key server; however, in a practical system, any number of such elements may be provided, except that in a typical arrangement there is one key server for each security domain.

Figure 5B:
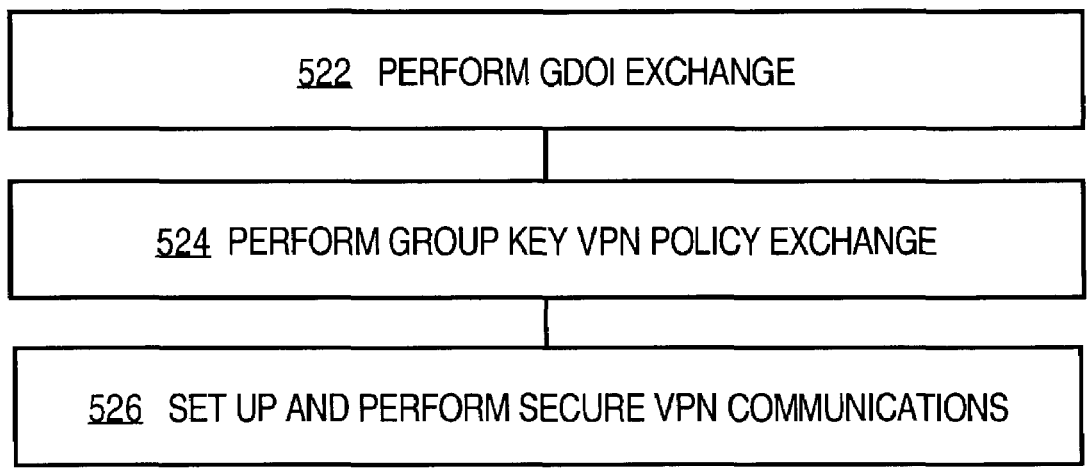
FIG. 5B is a flow diagram illustrating a high-level view of a GKVPN approach.

FIG. 5B is a flow diagram illustrating a high-level view of a GKVPN approach. FIG. 5B illustrates, in one aspect, how GKVPN processing integrates with IKE and GDOI for the purposes of providing an authenticator to IKE as described in Section 2. In block 522, a GDOI key exchange is performed, after which the GDOI processing modules of all members in a particular security domain possess a shared secret for the group.

In block 524, a GKVPN policy exchange is performed, using processes described further in subsequent sections; as a result, a GKVPN client acquires the group shared secret from a GDOI processing module, along with policy information that is associated with the shared secret. The policy information is received in a payload field of a specified GDOI message. Optionally, the policy information may include a group membership list, so that a first peer can determine whether a second peer, with which it desires to have a VPN connection, is a member of a defined group of trusted peers. Alternatively, the group membership list may be received periodically through a TCP download, or tunnel endpoint detection (TED) may be used to determine group membership of an unknown peer.

In block 526, secure VPN communications are set up and performed following the completion of an IKE Phase 1 exchange in which a pairwise key that is derived from a group key is used by each peer to authenticate itself to the other peer. Block 526 may involve, for example, an IKE negotiation of a pairwise key among peers at endpoints of a VPN connection, and communicating data packets that are encrypted using the pairwise key.

3.2 Establishing a VPN Using Group Key Distribution

Figure 6:
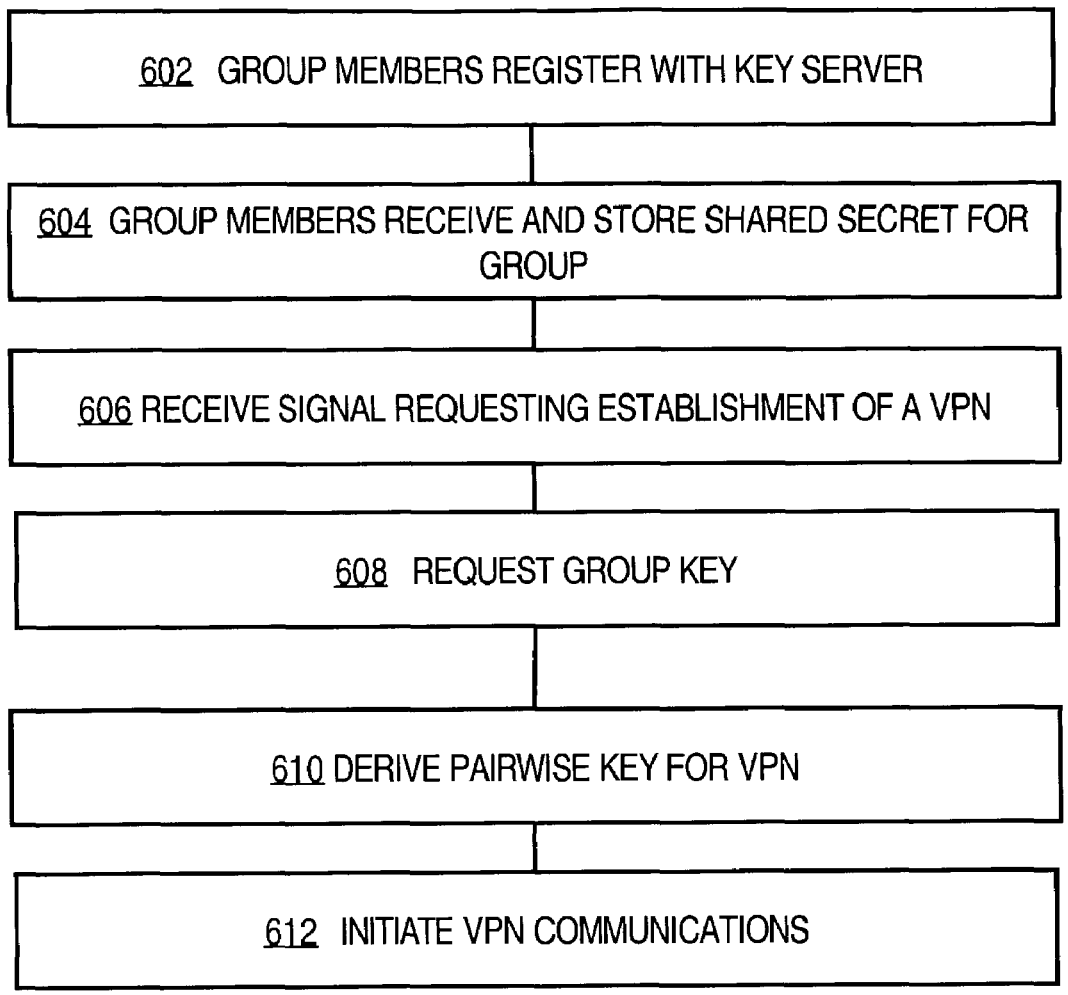
FIG. 6 is a flow diagram of a process of establishing a VPN using group keys.

FIG. 6 is a flow diagram of a process of establishing a VPN using group keys, according to one embodiment. For purposes of illustrating a clear example, the process of FIG. 6 is described with reference to the example network of FIG. 5A. However, embodiments are not limited to that context, and may be used in any network context.

In block 602, all group members in a security domain register with a key server. In the example of FIG. 5A, routers 502A, 502B, 502C register with key server 512. Block 602 also may involve configuring a router, by issuing appropriate CLI commands to GDOI module 508, that cause the router to join an agreed upon GDOI group.

In block 604, the group members receive and store a shared secret for the group. For example, each router 502A, 502B, 502C separately connects to key server 512, and negotiates a separate short-term pairwise key. If a shared group secret exists, then key server 512 retrieves it; otherwise, the key server generates a new shared group secret. For each router 502A, 502B, 502C that contacts it, key server 512 then encrypts the shared group secret under the pairwise key of that router and provides the encrypted shared secret to that router. As a result, all group members have the same shared secret. For purposes of describing algorithms herein, the group shared secret is designated Kg.

The short-term pairwise keys may be generated, for example, by applying a pseudorandom function to the shared secret in combination with identity information that uniquely identifies the group members and key server. The identity information may be obtained using TED, which is configured to discover a remote peer's identity. Alternatively, nonce values from each peer are used, as described further below.

Further, as part of block 604, each router stores the shared group secret in memory in a location that is accessible to or managed by GDOI module 508.

In block 606, a signal requesting establishment of a VPN is received. For example, an administrator interacting with operating system 504 of router 502A requests the operating system to establish a VPN connection to router 502B. In block 608, the group key is requested. For example, IKE module 506 requests GDOI module 508 to provide the group key and associated policy information; in response, the GDOI module provides the group key and policy information.

In block 610, a pairwise key for use in authenticating the group member to a peer group member is derived. For example, IKE module 506 uses the policy information as appropriate, and derives one or more pairwise keys for communicating with router 502B using the group key. Block 610 also involves performing or completing a key exchange with the other group member to the VPN, such as router 502B, using IKE or any other suitable key exchange mechanism.

In one specific implementation, the following steps are used. Assume that router 502A is designated as group member A and router 502B is designated as group member B. For group member A to communicate with member B, both A and B generate a pairwise key designated Kab. Both A and B must be able to compute the same key value independently. In one embodiment, the computation is:

$$Kab=PRF(Kg|IPa|IPb)$$

wherein PRF is a pseudorandom function, and IPa and IPb are the IP addresses of A and B, respectively.

When IKE Main-mode is used, though, identity information is not known unless the shared-secret is known. Accordingly, in one alternative approach, nonce values obtained from messages 1 through 4 in the IKE Main-mode message exchange are used. For example, the computation is:

$$Kab=PRF(Kg|Na|Nb)$$

where Na and Nb are nonce values contributed by each peer, respectively, Kg is the group key, and PRF is a pseudorandom function that was negotiated in IKE, such as SHA-1, MD5, etc. Each peer acquires knowledge of the nonce value contributed by the other peer during Phase 1 of IKE, in block 612 of FIG. 6 prior to the authentication step where the Kab is used as the IKE authenticator.

By the foregoing computation, A and B establish an IKE connection and can then negotiate and maintain IPsec keys. Thus, in block 612, VPN communication is initiated with another group member serving as the endpoint of the VPN. For example, router 502A initiates VPN communication with router 502B; packet flows on the VPN are encrypted using an IPsec key that is negotiated among router 502A and 502B using the IKE connection they have established.

Thus, GDOI module 508 helps establish secure keys for all members of the security domain, comprising routers 502A, 502B, 502C, and operates in a server role with IKE module 506 as its client. IKE module 506 is only one example of a GKVPN client that may interact with GDOI module 508. Other examples of GKVPN clients include SSL, TLS, or other key establishment protocols.

3.3 Re-Keying

Figure 7:
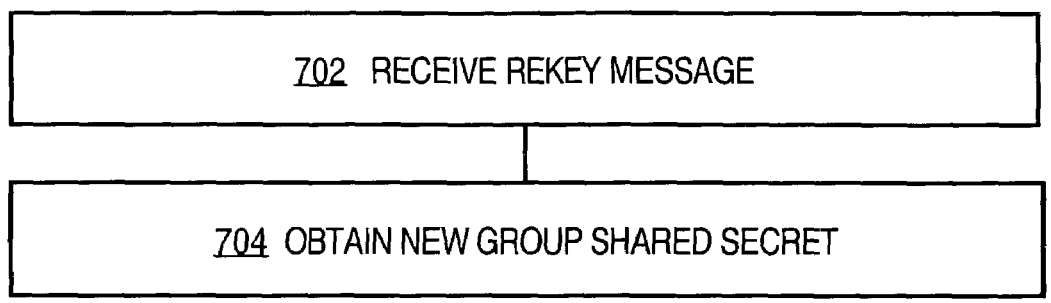
FIG. 7 is a flow diagram of a process of re-keying the group keys.

FIG. 7 is a flow diagram of a process of re-keying the group keys. Re-keying is performed, for example, when the group key is compromised, the group key expires, or when group members enter or depart from a security domain.

In block 702, a re-key message is received. For example, router 502A receives a re-key message from key server 512. The re-key message may be a multicast message, which is appropriate when there is a need to distribute new group keys to multiple members of a security domain.

In block 704, a new group shared secret is obtained. In one embodiment, each group member that receives the re-key message extracts context data from the re-key message and uses the context data to decrypt the re-key message. The decrypted re-key message provides the new group shared secret.

A single re-key message can be used to exclude a selected group member using key tree approaches. For example, the key tree techniques described in RFC 2627 may be used.

3.4 Communicating Policy Information

According to one embodiment, policy information is communicated among group members participating in a VPN, during the GDOI key exchange in block 522 of FIG. 5B, by placing the policy information in a GDOI security association ("SA") payload field. At the time of this writing, GDOI is defined only for IPsec security associations, in particular, the SA traffic encryption key ("TEK") payload defined in GDOI is defined only for IPsec security associations. The type GDOI_PROTO_IPSEC_ESP defines the payload. Therefore, in one embodiment, a new SA TEK payload is defined for each type of GKVPN client. Thus, for example, an IKE GKVPN client described in the previous sections, such as IKE module 506 of router 502A uses an SA TEK payload of type GDOI_PROTO_GKVPN_IKE. Other GKVPN clients are provided with their own SA TEK payloads, since the expected policy information normally is specific to the type of client and not reusable by other clients.

The policy information that is used in a GKVPN IKE key exchange, as in block 610 of FIG. 6, is the same as the policy information that is used in a conventional IKE key exchange. The policy information typically includes IKE information about ciphers and hash functions, etc. In one embodiment, all members of a group are assumed to share the same IKE connection policy, so that policy information obtained with the key from the GDOI module (as in FIG. 6, block 608) applies to all IKE connections among group members. This precludes the need to obtain a large volume of different policy information for all possible pairwise connections of one router to another router.

The IKE Phase 2 selector values are separately established. For example, in various embodiments, the Phase 2 values are established based on traffic, pre-configuration, or an out-of-band mechanism, such as the Cisco Tunnel Endpoint Discovery (TED) protocol.

Figure 8:
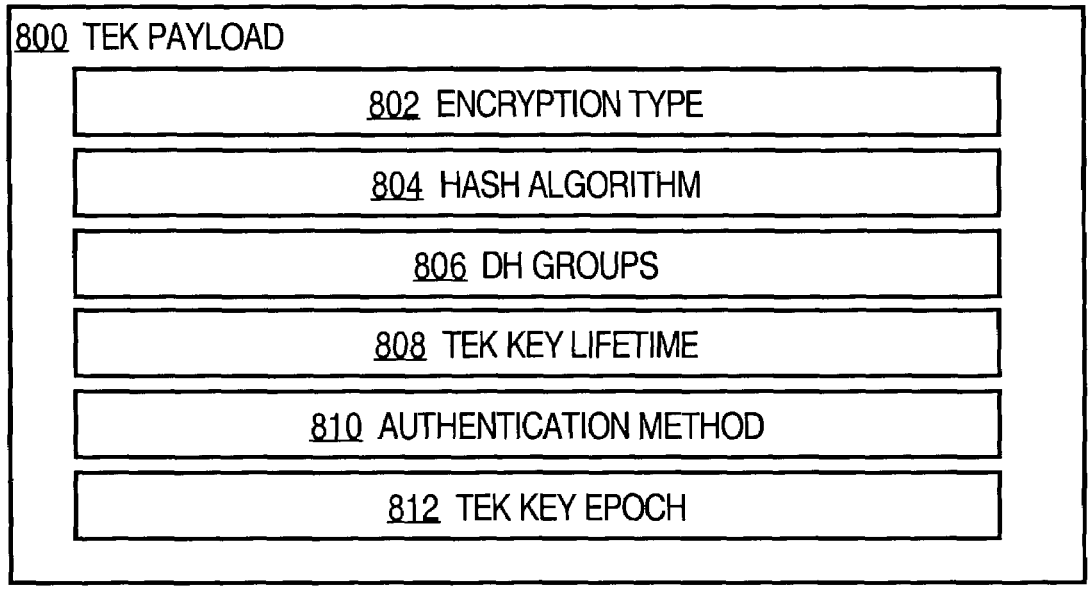
FIG. 8 is a block diagram of an example TEK payload.

FIG. 8 is a block diagram of a TEK payload data structure, according to one embodiment. In the example of FIG. 8, a TEK payload data structure 800 comprises an encryption type value 802, hash algorithm value 804, DH Groups value

806, TEK key lifetime value 808, authentication method value 810, and TEK key epoch value (or key sequence number) 812.

The encryption type value 802 identifies the type of encryption that is used and may have values specifying DES, triple DES, AES, etc. The hash algorithm value 804 identifies the kind of hash algorithm that is used and may have values specifying SHA-1, MD5, etc. The DH Groups value 806 signifies the Diffie-Hellman group value as defined by RFC 2412 ("The OAKLEY Key Determination Protocol") and may have values of "1," "2," "5," etc. The TEK key lifetime value 808 specifies a maximum validity period for the TEK key. The authentication method value 810 specifies the form of authentication that is used; in embodiments of a GKVPN for IKE as described herein, its value is "pre-share," and any other value is invalid.

The TEK key epoch value 812 specifies a continuously increasing key sequence number in order to uniquely identify a key. In conventional use of IPsec, a SPI value is used to identify a key. When IKE pre-shared keys are used, the SPI value is not available, and therefore the GKVPN approach herein needs a means of conveying a key version value or key sequence value to be used to derive pairwise keys. This epoch or sequence number must be conveyed to the remote peer node during IKE negotiation (and/or during use of tunnel endpoint detection [TED] protocol) so that the remote peer node can determine whether the TEK is up to date. If the TEK is outdated, the remote peer node refuses it.

3.5 Command-Line Interface Approaches

In one embodiment, network devices are configured to operate using the GKVPN approach as described herein by issuing one or more command-line interface (CLI) commands to a CLI interpreter of the operating system of the network device. For example, referring to FIG. 5A, an administrator uses a terminal interface to router 502A to issue CLI commands to operating system 504. Example CLI commands and their functions are now described. For purposes of convenience, an implementation in the context of router 502A of FIG. 5A is described; however, embodiments are not limited to the context of FIG. 5A.

GDOI consists of two phases. The first phase involves a regular IKE phase 1 exchange. Therefore, in one CLI implementation, a key server is defined only by its IP address, but without group-number information. Group-number information, group type information and other information may be passed to GDOI module 508 from applications using an appropriate GDOI application programming interface (API), as further described herein. IKE module 506 is an example of such an application; other applications include IPsec, BGP, or other applications contained in or managed by operating system 504. The group-number and group type information may be provided, for example, when group members register with the key server (FIG. 6, block 602) or when a group key is requested (FIG. 6, block 608). Group type values may specify IPsec multicast SA, IKE pairwise pre-shared secret, etc.

Further, global IKE phase 1 policy information (such as encryption type, hash type, etc) is implicitly received from a set of global ISAKMP policy values that are maintained by the router. If ISAKMP profiles are available in the router, then the key server-definition can also include this policy profile name. Thus, the key server is defined as an IKE phase 1 peer, and shares ISAKMP phase 1 policy settings with the rest of the IKE configuration.

According to one embodiment, the key server is defined using a CLI command that provides a general group-membership definition, which can be referenced by other parts of the configuration, and having the following format:

crypto isakmp gdoi key-server <key-server-name>
       address ipv4 <ip address>
       isakmp profile <isakmp profile> wherein the "isakmp profile" value is optional, and by default a global IKE policy value is used.

The GDOI group-number, used in GDOI phase 2, comes from the application desiring service from GDOI, and is therefore part of that application's configuration.

To configure a default or fallback, the following CLI is defined. The CLI command conveys the semantics that a device joins a group identified by the group number, but there is not information concerning peer membership.

crypto isakmp gkvpn <key-server-name> group <num>

If the IP addresses or names of the IKE peers are known in advance, then an administrator can define an access list to define the list of members, and assign the members to a group. However, including a peer in an ACL does not include the peer in a group; if the group controller excludes a member, then the router cannot negotiate with that member. The configuration of IKE module 506 then references the key-server by name and defines the group number for the group it expects to use for IKE pre-shared keys, by matching an ACL, using the following CLI:

crypto isakmp gkvpn <key-server-name> group <num>
       match <acl>

To join multiple groups, multiple "crypto isakmp gkvpn" lines using the foregoing syntax are configured. However, in the absence of membership lists in GDOI/GKVPN, or without access-lists for matching defined in the configuration, operating system 504 only can be part of a single group, because it is impossible under current IKE protocol definitions to distinguish who is in which group.

To implement the foregoing functions, IKE module 506 implements a state machine having states that listen for messages from GDOI module 508 and respond with appropriate action, as suggested by the GDOI API described herein. For example, for each CLI command of the form "crypto isakmp gkvpn <name> group <number>," IKE module 506 sends a registration message that includes a key server name and group number value to GDOI module 508.

Further, IKE module 506 listens for all key-change and GDOI-failure messages that are sent by GDOI module 508.

3.6 Integration with IKE Protocol and TED Protocol

In one embodiment, certain changes to IKE protocol operations are implemented. Specifically, if group membership lists are not used, modifications to IKE and TED are used to address group membership problems or group key epoch mismatches.

In order to detect synchronization problems with respect to GDOI group keys, a router acting as an initiator node and a responder node convey the TEK epoch value to the peer. This is performed by providing a vendor-id in the third (MM3) and fourth (MM4) IKE "Main Mode" exchange messages, or in the first (AG1) and second (AG2) IKE "Aggressive Mode" messages. If the epoch value that is received represents a future point in time, then the receiving peer contacts the key server. Preferably, the receiving peer determines whether the peer is under attack before contacting the key server, because a message that forced the peer to initiate a GDOI exchange would expose the peer to a denial of service ("DOS") attack.

In addition, the peers communicate their group membership information to the each other, so that a particular peer can select the right group key when it is deriving the pairwise shared secret. In one embodiment, the group membership information is communicated using a vendor-id field in the MM3 and MM4 messages, or the AG1 and AG2 messages.

The TED protocol may be modified in the same way, so that group membership and epoch values for each group key are conveyed.

3.7 Security Enhancements

To improve security of the system, the lifetime of the group key should be limited. Assume that IKE Main Mode is used with pre-shared keys, and an active attacker intercepts all messages of the exchange. The active attacker that does not know the pre-shared key cannot decrypt message 5, but now has all necessary information to compute HASH_I (which is defined as prf1(SKEYID, g^xi|g^xr|CKY-I|CKY-R|SAi_b|IDii_b)), except for SKEYID (defined as prf(pre-shared-key, Na|Nb)), which is the goal of the attacker. Working backwards, the attacker knows Na and Nb, so the goal is to derive the pre-shared key; this is equivalent to breaking a hash function, such as MD5 or SHA1 in the case of IKE, which is generally assumed to be impractical within a reasonable time.

The number of hashes that are created and seen by the attacker based on the same group key is minimized if the lifetime of the group key is limited.

In addition to discovering peer identity information as described above with respect to block 604 of FIG. 6, if membership lists are not used, TED can be used to discover group membership. For example, if a router or other node is part of multiple groups, the router can convey group membership in the TED request to a peer having an unknown identity. A peer acting as a TED responder then replies only if there is a non-empty intersection between the group memberships of the responder and the group memberships of the requesting router. The responder conveys the intersection of groups in a TED reply message.

In an alternative approach, a router inserts a list of groups to which it belongs in another payload in the TED request. In yet another alternative, for each group of which the router is a part, an HMAC over the entire TED packet is computed, and the list of authenticators is attached to the TED packet. Use of a nonce in the TED packet is required to avoid replay attacks. The responder then calculates HMAC values over the TED packet using the responder's group keys, comparing the result to the HMACs transmitted by the peer. If at least one matches, then the responder is known to share a group key with the initiator. To determine an intersection of all groups that are shared, the router runs all its group keys and compares the results with all the HMACs that are transmitted.

In yet another alternative, both of the foregoing approaches are combined; however, this alternative may involve transmitting group membership information over an insecure network via a TED probe. The TED exchanges may be authenticated so that a responding peer can verify that an initiator peer is properly sending group membership information to it.

3.8 Initial Provisioning

In all embodiments herein, an initial provisioning or initial authorization step is performed prior to initiating the process of FIG. 6, in which IKE authentication information is configured on both the device and the key server such that they can communicate. The authentication information may be an IKE pre-shared key, digital certificates, etc.

In one initial provisioning approach, an existing username/password database is used. For example, assume that the enterprise that owns or operates routers 502A, 502B, 502C, 512 has an authentication, authorization and accounting ("AAA") database for remote dial-in use by users who are performing text logins, PPP dialup connections, etc., or an existing NT domain controller configured with username and passwords. In this approach, when a new router is shipped to a remote location, for example, the user enters an existing password into the router upon opening and installing the router. Alternatively, the router is shipped to the remote location with the correct password already installed. Other approaches for initial authorization, including automatic provisioning, may be used.

3.9 Integration with Membership List Functions

A membership list is information, stored in a peer node such as a router, that identifies all groups and nodes that belong to each group, and also defines all other peers for which a particular router can derive pairwise keys. Use of membership lists offers numerous implementation advantages. For example, in combination with re-key messages, membership lists may be used to enforce real-time disconnection of revoked or compromised peers. In GDOI, re-keying is accomplished with a "group key-push" message, which can be used to update keys as well as policy.

Further, having a membership list available means that a particular router can determine whether a particular peer is within a group to which that particular router belongs, thereby eliminating the need to request group membership information using TED or another protocol. Without membership lists, the router is required to initiate to the peer, perform pairwise key derivation, on the assumption that the peer can perform the same derivation. If the exchange succeeds, then the peer is a member of the group. If the exchange fails, the initiating router assumes that the peer is not part of the group, and the initiating router has wasted CPU cycles to make such a determination. In contrast, determining that the peer is within the group as indicated by the membership list provides confidence that a key negotiation will succeed.

Receiving real-time updates to a membership list also allows a router to quickly sever connections to peers that have just been removed from the group. Severing such connections is performed, for example, by deleting from memory all phase 1 and phase 2 SAs associated with a newly invalid peer. In the absence of such updates, membership updates are available only through group key-pull messages in GDOI phase 2.

In one embodiment, three different types of registration and update messages are provided by operating system 504 to support membership lists: Member add, Member delete, and Membership list.

When operating system 504 receives a Member Delete message, the operating system deletes from memory any phase 1 and phase 2 SA's that are associated with that peer.

Processing a Membership list message involves receiving a Membership List URL and a Membership List. The URL is provided in the event that the router has missed an update, which the router determines by the sequence number on the update. If so, then the router can request and receive the current membership list from the key server in a unicast message. If the membership list is not too large for a UDP packet, it is sent in-line.

In one embodiment, a complete list of updates, or a corresponding URL, sent periodically, and updates are sent at other times in between each full list. For example, the full list is sent every thirty minutes, and updates are sent asynchronously throughout the thirty-minute period. Each re-key message, which contains an update, has a sequence number. Each router that receives an update is required to store the last sequence number, so that it can verify whether any updates have been missed. If one or more updates have been missed, then the recipient requests the key server to send a unicast message containing the complete membership list.

The time interval used for the periodic updates of the membership list depends on how nodes are deployed and the perceived risk of threats to the network. Thus, some users may want shorter times and better security, and some may desire less CPU usage and network utilization in exchange for a longer time between updates.

3.10 Application Programming Interface for GDOI Module

In one embodiment, in order for a GKVPN client such as IKE module 506 to use GDOI module 508, the GDOI module provides an API to facilitate communication and data transfer between the client and the GDOI module.

In this embodiment, applications such as IKE module 506 and GDOI module 508 communicate via a GDOI handle value. The handle value uniquely identifies a combination of values consisting of an application process identifier, application message identifier, key server name, group number, and GDOI-type. Thus, use of a handle value precludes the need to repeat the foregoing information in subsequent messages.

In one specific embodiment, the GDOI API comprises a Registration function, GDOI Failure message, a Key Changed message, and a De-Registration message. The Registration function may be implemented as a programmatic function call, and the messages may be implemented using inter-program communication (IPC) mechanisms.

The Registration function enables an application, such as GKVPN module 506, to request and receive a membership-join to a certain group. The application determines when to call the Registration function in order to perform group membership registration. The application passes the group-name that defines the key server to the GDOI module 508, as well as the group-number that it wants to join. The application also passes a value that instructs the GDOI module 508 which queue to use, and which queue-subtype to use, when sending messages back to the application.

In response, as a result of a successful registration, GDOI module 508 returns a handle value to the application. The application uses the handle value when making key requests to the GDOI module 508. The handle value is created by the GDOI module 508 immediately in response to a successful registration and returned in the same call. Further, the GDOI module 508 provides the handle value when it sends asynchronous key update messages to one or more applications. The application also uses the handle value when issuing subsequent requests to the GDOI module 508.

In response to a successful registration, GDOI module 508 initiates a GDOI phase 2 (group key-pull) message exchange. When the group key-pull exchange is finished, GDOI module 508 communicates a result value (such as Success or Failure) to the application using a Key Changed message. If the result is Success, then the associated SA TEK policy is passed to the application as well.

The GDOI Failure message is sent by the GDOI module 508 to the application if the GDOI exchange fails for any reason. In one embodiment, the GDOI Failure message includes a failure indication value that identifies a specific reason for failure. An application is configured to expect to receive a GDOI Failure message at any time, and not just as the result of a Registration request. For example, negotiation of a key during a Re-Key operation could fail, in which case the application is expected to delete any state and keys associated with the then-current group. In response to receiving a GDOI Failure message, an application may request the GDOI module 508 to try the same operation again. Alternatively, in another embodiment, the GDOI module 508 may retry the operation automatically, one or more times.

A Key Changed message is issued for the purpose of initially providing a key, and thus serves as an initial key-pull message, and is also sent for any subsequent key and membership-list updates. The GDOI module 508 sends the Key Changed message as an asynchronous message to the application, providing the handle value and the new policy information (for example, membership list, connection-policy, and group key values). The Key Changed message may have one or more subtypes that are associated with different reasons as to why the key changed. In one embodiment, the subtypes are No Extra Information, Member Add, Member Delete, and Membership List.

The No Extra Information key change subtype indicates that the GDOI module 508 is informing the application about a new key, but has no additional information about why the key changed. For example, the No Extra Information key change subtype is used in implementations or with routers that do not support or use group membership lists. A Key Change message having the No Extra Information key change subtype is sent, for example, if the previous key expired, and the GDOI module 508 has received or negotiated a new group key.

The Member Add key change subtype is used when a router or other network node has been added to a membership list. In response, an application receiving the message is expected to update internal tables with the new information to keep track of who it is and is not allowed to create keys for, and what policy to use when setting up a pairwise connection using the pairwise key.

The Member Delete key change subtype is used when a router or other network node has been deleted from a membership list. In response, an application receiving the message is expected to delete all SAs associated with the peer node that has been removed from the group.

The Membership List message is used by GDOI module 508 to send a complete group membership list to an application. In response to receiving the Membership List message, an application is expected to verify its internal view of group membership against the list, because membership updates (add and delete) can be missed by group members. How such verification occurs may vary depending on the application. For example, an application may delete an entire membership list table and replace it with the new list, or check each member on the list against the current list to determine who was removed or added, and modify its list or table accordingly.

The De-registration message is used to remove a registration of an application to the GDOI module 508. For example, the De-registration message is used when an application shuts down or no longer needs the services of the GDOI module 508 for the specified group. In such a case, the application sends the GDOI handle value that it received in response to an earlier from the registration call to the GDOI module 508, and requests the GDOI module to remove all state associated with the group-number associated with the GDOI handle value. If the application joined any multicast groups for the purpose of participating in the GDOI group, then the application also sends a "multicast group leave" message, such as an IGMP leave message.

In one embodiment, the API of GDOI module 508 also supports use of a type value, in which a particular type value is uniquely associated with each type of application. For example, when GDOI is used for IKE pre-shared keys, a type value of GDOI_IKE_PRESHARE is used. Other type values may comprise, for example, GDOI_IPSEC_MULTICAST, GDOI_BGP_MD5_SECRET, GDOI_BGP_IPSEC, etc.

4.0 Implementation Mechanisms—Hardware Overview

Figure 9:
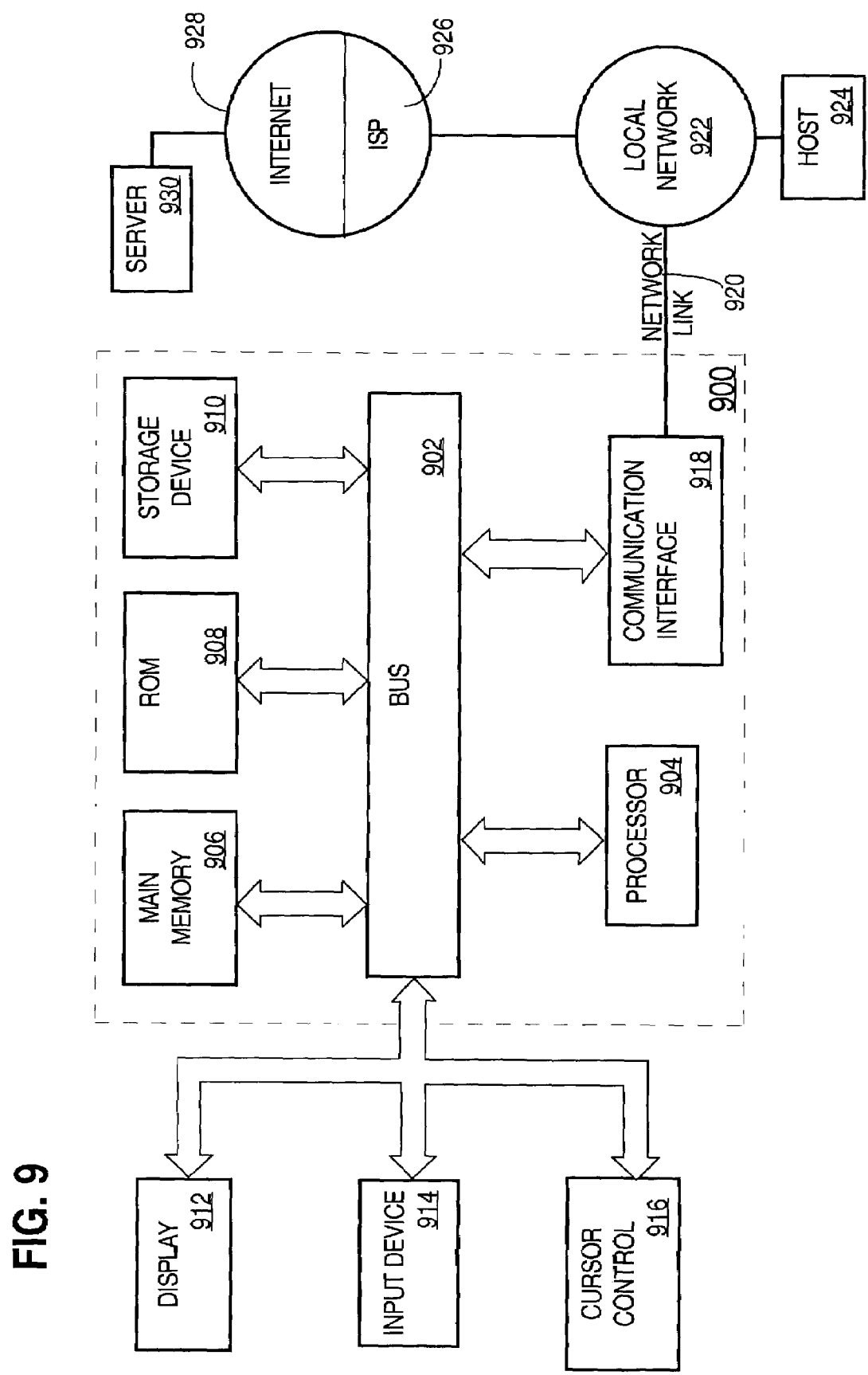
FIG. 9 is a block diagram that illustrates a computer system upon which an embodiment may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory ("RAM") or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube ("CRT"), for displaying information to a computer user. An input device 914, including alphanumeric and other keys, is coupled to bus 902 for communicating information and command selections to processor 904. Another type of user input device is cursor control 916, such as a mouse, trackball, stylus, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for generating pairwise cryptographic transforms based on group keys. According to one embodiment of the invention, generating pairwise cryptographic transforms based on group keys is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network ("ISDN") card or a modem to provide a data communication connection to a corresponding type of telephone line. As another example, communication interface 918 may be a local area network ("LAN") card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for generating pairwise cryptographic transforms based on group keys as described herein.

The received code may be executed by processor 904 as it is received, and/or stored in storage device 910, or other non-volatile storage for later execution. In this manner, computer system 900 may obtain application code in the form of a carrier wave.

5.0 Extensions and Alternatives

In the foregoing specification, a method and apparatus for generating pairwise cryptographic transforms based on group keys has been described with reference to specific embodiments. The disclosed embodiments provide numerous benefits such as faster establishment of secure communication sessions, automated management of pre-shared key authenticators, and expansion in the capability of VPNs, servers, concentrators, and other devices that provide security services to host computers. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of generating a cryptographic transform for use in a point-to-point secure communication session among a first node and a second node that are enrolled in a secure communication group, the method comprising the computer-implemented steps of:
   receiving a group key for use in secure communication among members of the secure communications group that includes the first node and the second node, wherein the first node is seeking to initiate the secure point-to-point communication session within the secure communications group with the second node wherein the secure point-to-point communication session allows the first and the second node to communicate with each other privately with respect to other members of the secure communications group;
   receiving one or more descriptor values that are associated with the group key;
   deriving, based on the group key and the one or more descriptor values, a data-security session key for use in the secure point-to-point communication session by only the first node and the second node privately with respect to the other secure communications group members;
   wherein the secure communications group comprises at least one node besides the first and second node, wherein the group key comprises a single group key that is common to all nodes of the secure communications group and wherein the deriving step is performed within the secure communications group, independently, by only each of the first and second nodes;
   encrypting one or more data packets using the data-security session key; and
   communicating the one or more data packets privately with respect to the other secure communications group members, to the second node as part of the secure communication session.

2. A method as recited in claim 1, further comprising the steps of:
   receiving, at both the first node and the second node, as the descriptor values, one or more identity attributes in a Security Association payload as defined in IETF RFC 2407; and
   deriving the data-security session key based on the group key and the identity attributes.

3. A method as recited in claim 2, wherein the step of deriving the data-security session key comprises the steps of applying the group key and the identity attributes to a key derivation function, resulting in generating a data-security session key that is unique for a pair of peers consisting of the first node and the second node.

4. A method as recited in claim 3, wherein the key derivation function is a one-way hash function.

5. A method as recited in claim 1, further comprising the steps of:
   receiving a Security Parameter Index (SPI) value as one of the descriptor values;
   deriving the data-security session key based on the SPI value; and
   encrypting the one or more data packets by applying the SPI value to a keystream generator to result in generating a keystream segment, and by using the keystream segment as an encryption key.

6. A method as recited in claim 5, wherein the step of deriving the data-security session key comprises the steps of applying the group key and the SPI value to a key derivation function, resulting in generating a data-security session key that is unique for a pair of peers consisting of the first node and the second node.

7. A method as recited in claim 6, wherein the key derivation function is a one-way hash function.

8. A method as recited in claim 1, further comprising the steps of:
   receiving, as one of the descriptor values, an IPsec ESP sequence number that is generated as part of negotiating initiation of an IPsec session among the first node and the second node;
   deriving the data-security session key based on the sequence number; and
   encrypting the one or more data packets by applying the sequence number value to a keystream generator to result in generating a keystream segment, and by using the keystream segment as an encryption key.

9. A method as recited in claim 1, further comprising the step of enrolling a potential member of the group in the group using a secure enrollment mechanism.

10. A method as recited in claim 9, wherein the secure mechanism comprises receiving and validating an X.509 digital certificate from the potential member.

11. A method as recited in claim 9, wherein the secure mechanism comprises receiving and validating a password that is generated by a one-time token card.

12. A method as recited in claim 1, wherein the first node and the second node are data packet routers and form a virtual private network (VPN).

13. In a network comprising a key server and first and second nodes that are communicatively coupled to the key server, wherein the first and second nodes each have received a group key for use in a secure communication group that comprises a first node and the second node and have received one or more descriptor values that are associated with the group key, and wherein the first node is seeking to initiate a secure point-to-point communication session with the second node, a method of generating a cryptographic transform for use to secure the communication session among the first node and the second node, the method comprising the computer-implemented steps of:
   deriving, based on the group key and the one or more descriptor values, a data-security session key for use in the secure point-to-point communication session between only the first node and the second node wherein the secure communications session allows the first and second node to communicate with each other within the secure communications group privately with respect to other members of the secure communications group;

wherein the secure communications group comprises at least one node besides the first and second node, wherein the group key comprises a single group key that is common to all nodes of the secure communications group and wherein the deriving step is performed within the secure communications group, independently, by only each of the first and second nodes;

encrypting one or more data packets using the data-security session key; and communicating the one or more data packets to the second node privately with respect to other members of the secure communications group as part of the secure point-to-point communication session.

14. A method as recited in claim 13, wherein the deriving step further comprising the steps of determining a one-way hash value based on the group key and the one or more descriptor values.

15. A method as recited in claim 13, wherein the deriving step further comprising the steps of determining a one-way hash value based on the group key and one or more identity attributes received in a Security Association payload as defined in IETF RFC 2407.

16. A method as recited in claim 13, further comprising the steps of:
receiving a Security Parameter Index (SPI) value as one of the descriptor values;
deriving the data-security session key based on the SPI value; and
encrypting the one or more data packets by applying the SPI value to a keystream generator to result in generating a keystream segment, and by using the keystream segment as an encryption key.

17. A method as recited in claim 13, further comprising the steps of:
receiving, as one of the descriptor values, an IPsec ESP sequence number that is generated as part of negotiating initiation of an IPsec session among the first node and the second node;
deriving the data-security session key based on the sequence number; and
encrypting the one or more data packets by applying the sequence number value to a keystream generator to result in generating a keystream segment, and by using the keystream segment as an encryption key.

18. A computer-readable medium carrying one or more sequences of instructions for generating a cryptographic transform for use in a point-to-point secure communication session among a first node and a second node that are enrolled in a secure communication group, which instructions, when executed by one or more processors, cause the one or more processors to carry out a process that comprises the steps of:
receiving a group key for use in secure communication among members of the secure communications group that includes a first node and a second node, wherein the first node is seeking to initiate a secure point-to-point communication session within the secure communications group with the second node wherein the secure point-to-point communication session allows the first and the second node to communicate with each other privately with respect to other members of the secure communications group;
receiving one or more descriptor values that are associated with the group key;
deriving, based on the group key and the one or more descriptor values, a data-security session key for use in the secure point-to-point communication session by only the first node and the second node privately with respect to the other secure communications group members;

wherein the secure communications group comprises at least one node besides the first and second node, wherein the group key comprises a single group key that is common to all nodes of the secure communications group and wherein the deriving step is performed within the secure communications group, independently, by only each of the first and second nodes;

encrypting one or more data packets using the data-security session key; and communicating the one or more data packets privately with respect to the other secure communications group members, to the second node as part of the secure communication session.

19. A computer-readable medium as recited in claim 18, wherein the deriving step further comprises the step of determining a one-way hash value based on the group key and the one or more descriptor values.

20. A computer-readable medium as recited in claim 18, wherein the deriving step further comprising the steps of determining a one-way hash value based on the group key and one or more identity attributes received in a Security Association payload as defined in IETF RFC 2407.

21. A computer-readable medium as recited in claim 18, wherein the process further comprises the steps of:
receiving a Security Parameter Index (SPI) value as one of the descriptor values;
deriving the data-security session key based on the SPI value; and
encrypting the one or more data packets by applying the SPI value to a keystream generator to result in generating a keystream segment, and by using the keystream segment as an encryption key.

22. A computer-readable medium as recited in claim 18, wherein the process further comprises the steps of:
receiving, as one of the descriptor values, an IPsec ESP sequence number that is generated as part of negotiating initiation of an IPsec session among the first node and the second node;
deriving the data-security session key based on the sequence number; and
encrypting the one or more data packets by applying the sequence number value to a keystream generator to result in generating a keystream segment, and by using the keystream segment as an encryption key.

23. An apparatus for generating a cryptographic transform for use in a point-to-point secure communication session among a first node and a second node that are enrolled in a secure communication group, comprising:
means for receiving a group key for use in secure communication among members of the secure communications group that includes a first node and a second node, wherein the first node is seeking to initiate a secure point-to-point communication session within the secure communications group with the second node wherein the secure point-to-point communication session allows the first and the second node to communicate with each other privately with respect to other members of the secure communications group;
means for receiving one or more descriptor values that are associated with the group key;

means for deriving, based on the group key and the one or more descriptor values, a data-security session key for use in the secure point-to-point communication session by only the first node and the second node privately with respect to the other secure communications group members;

wherein the secure communications group comprises at least one node besides the first and second node, wherein the group key comprises a single group key that is common to all nodes of the secure communications group and wherein the deriving means function within the secure communications group, independently, in only each of the first and second nodes;

means for encrypting one or more data packets using the data-security session key; and means for communicating the one or more data packets privately with respect to the other secure communications group members, to the second node as part of the secure communication session.

24. The apparatus as recited in claim 23, further comprising:

means for receiving, at both the first node and the second node, as the descriptor values, one or more identity attributes in a Security Association payload as defined in IETF RFC 2407; and means for deriving the data-security session key based on the group key and the identity attributes.

25. The apparatus as recited in claim 24, wherein the deriving means comprise:

means for applying the group key wherein the identity attributes to a key derivation function; and means for generating, based on a function of the applying means, a data-security session key that is unique for a pair of peers consisting of the first node and the second node.

26. The apparatus as recited in claim 25, wherein the key derivation function comprises a one-way hash function.

27. The apparatus as recited in claim 23, further comprising:

means for receiving a Security Parameter Index (SPD value as one of the descriptor values;

means for deriving the data-security session key based on the SPI value; and means for encrypting the one or more data packets by applying the SPI value to a keystream generator to result in generating a keystream segment, and by using the keystream segment as an encryption key.

28. The apparatus as recited in claim 27, wherein the deriving means comprise:

means for applying the group key and the SPI value to a key derivation function; and means for generating, based on a function of the applying means, a data-security session key that is unique for a pair of peers that comprise the first node and the second node.

29. The apparatus as recited in claim 28, wherein the key derivation function comprises a one-way hash function.

30. The apparatus as recited in claim 23, further comprising:

means for receiving, as one of the descriptor values, an IPsec ESP sequence number that is generated as part of negotiating initiation of an IPsec session among the first node and the second node;

means for deriving the data-security session key based on the sequence number; and means for encrypting the one or more data packets by applying the sequence number value to a keystream generator to result in generating a keystream segment, and by using the keystream segment as an encryption key.

31. The apparatus as recited in claim 23, further comprising means for enrolling a potential member of the group in the group using a secure enrollment mechanism.

32. The apparatus as recited in claim 31, wherein the secure mechanism comprises receiving and validating an X.509 digital certificate from the potential member.

33. The apparatus as recited in claim 31, wherein the secure mechanism comprises receiving and validating a password that is generated by a one-time token card.

34. An apparatus for generating a cryptographic transform for use in a point-to-point secure communication session among a first node and a second node that are enrolled in a secure communication group, comprising:

a network interface that is coupled to the data network for receiving one or more packet flows therefrom;

a processor coupled to the network interface; and a storage coupled to the processor for supplying thereto one or more stored sequences of instructions which, when executed by the processor, cause the processor to carry out a process that comprises the steps of:

receiving a group key for use in secure communication among members of the secure communications group that includes a first node and a second node, wherein the first node is seeking to initiate a secure point-to-point communication session within the secure communications group with the second node wherein the secure point-to-point communication session allows the first and the second node to communicate with each other privately with respect to other members of the secure communications group;

receiving one or more descriptor values that are associated with the group key;

deriving, based on the group key and the one or more descriptor values, a data-security session key for use in the secure point-to-point communication session by only the first node and the second node privately with respect to the other secure communications group members;

wherein the secure communications group comprises at least one node besides the first and second node, wherein the group key comprises a single group key that is common to all nodes of the secure communications group and wherein the deriving step is performed within the secure communications group, independently, by only each of the first and second nodes;

encrypting one or more data packets using the data-security session key; and communicating the one or more data packets privately with respect to the other secure communications group members, to the second node as part of the secure communication session.

35. The apparatus as recited in claim 34 wherein the process further comprises:

receiving, at both the first node and the second node, as the descriptor values, one or more identity attributes in a Security Association payload as defined in IETF RFC 2407; and deriving the data-security session key based on the group key and the identity attributes.

36. The apparatus as recited in claim 35, wherein the deriving the data-security session key comprises:

applying the group key and the identity attributes to a key derivation function; and generating, based on the applying, a data-security session key that is unique for a pair of peers that comprise the first node and the second node.

37. The apparatus as recited in claim 36, wherein the key derivation function comprises a one-way hash function.

38. The apparatus as recited in claim 34, wherein the process further comprises:
receiving a Security Parameter Index (SPI) value as one of the descriptor values;
deriving the data-security session key based on the SPI value; and
encrypting the one or more data packets by applying the SPI value to a keystream generator; and
generating a keystream segment, based on the encrypting and with use of the keystream segment as an encryption key.

39. The apparatus as recited in claim 38, wherein the deriving the data-security session key comprises:
applying the group key and the SPI value to a key derivation function; and
generating, based on the applying, a data-security session key that is unique for a pair of peers that comprise the first node and the second node.

40. The apparatus as recited in claim 39, wherein the key derivation function comprises a one-way hash function.

41. The apparatus as recited in claim 34, wherein the process further comprises:
receiving, as one of the descriptor values, an IPsec ESP sequence number that is generated as part of negotiating initiation of an IPsec session among the first node and the second node;
deriving the data-security session key based on the sequence number;
encrypting the one or more data packets by applying the sequence number value to a keystream generator; and
generating, based on the encrypting, a keystream segment, with use of the keystream segment as an encryption key.

42. The apparatus as recited in claim 34, further comprising the step of enrolling a potential member of the group in the group using a secure enrollment mechanism.

43. The apparatus as recited in claim 42, wherein the secure mechanism comprises receiving and validating an X.509 digital certificate from the potential member.

44. The apparatus as recited in claim 42, wherein the secure mechanism comprises receiving and validating a password that is generated by a one-time token card.

* * * * *

UNITED STATES PATENT AND TRADEMARK OFFICE
CERTIFICATE OF CORRECTION

| | |
|---|---|
| PATENT NO. | : 7,234,063 B1 |
| APPLICATION NO. | : 10/229347 |
| DATED | : June 19, 2007 |
| INVENTOR(S) | : Mark Baugher et al. |

Page 1 of 1

It is certified that error appears in the above-identified patent and that said Letters Patent is hereby corrected as shown below:

Claim 27, column 25, line 40    Replace "(SPD)" with --(SPI)--

Signed and Sealed this

Sixteenth Day of September, 2008

JON W. DUDAS
*Director of the United States Patent and Trademark Office*